Figure 4:
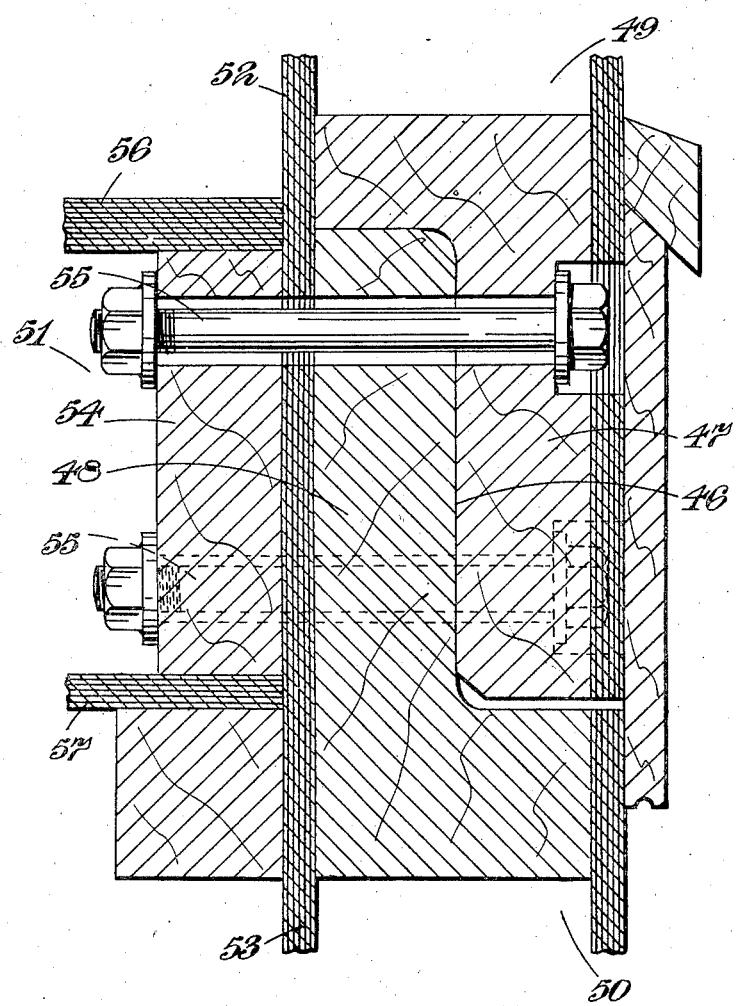

Jan. 4, 1949.                    H. HILL                    2,458,074
                      BUILDING UNIT JOINT CONSTRUCTION
Filed Aug. 21, 1945                                    6 Sheets-Sheet 1
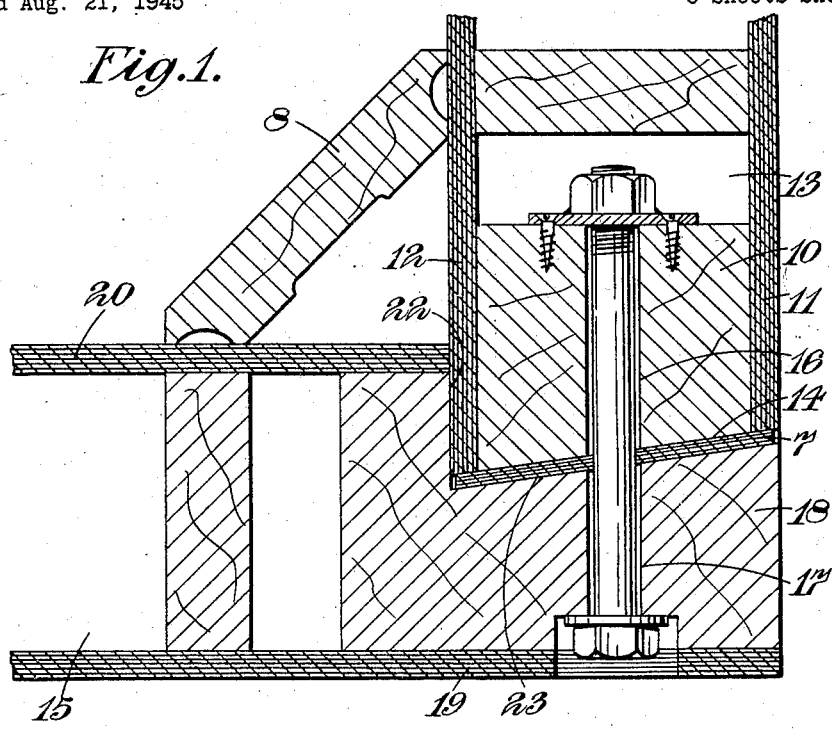
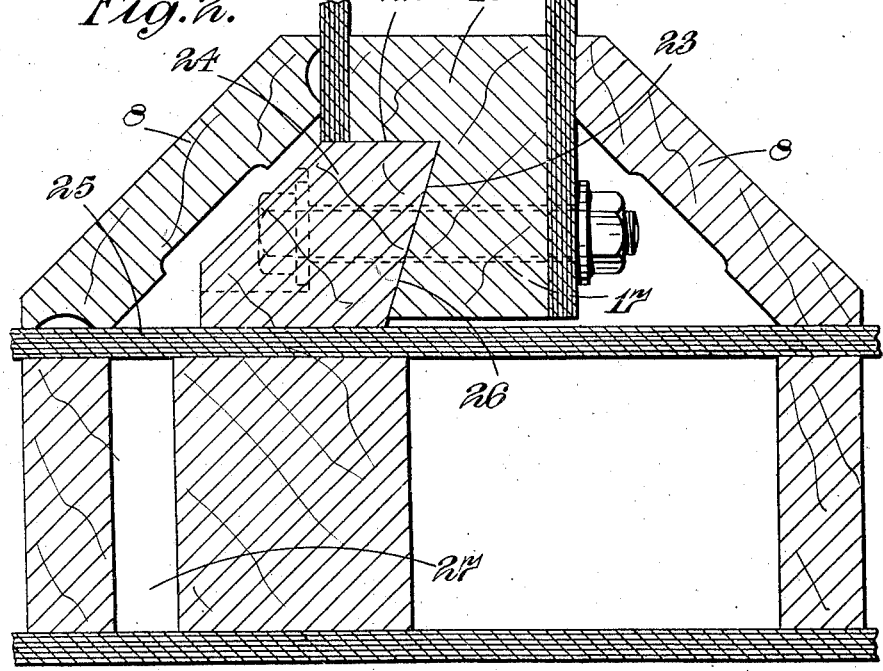
INVENTOR: Harry Hill
By Williams, Rich & Morse
                attys

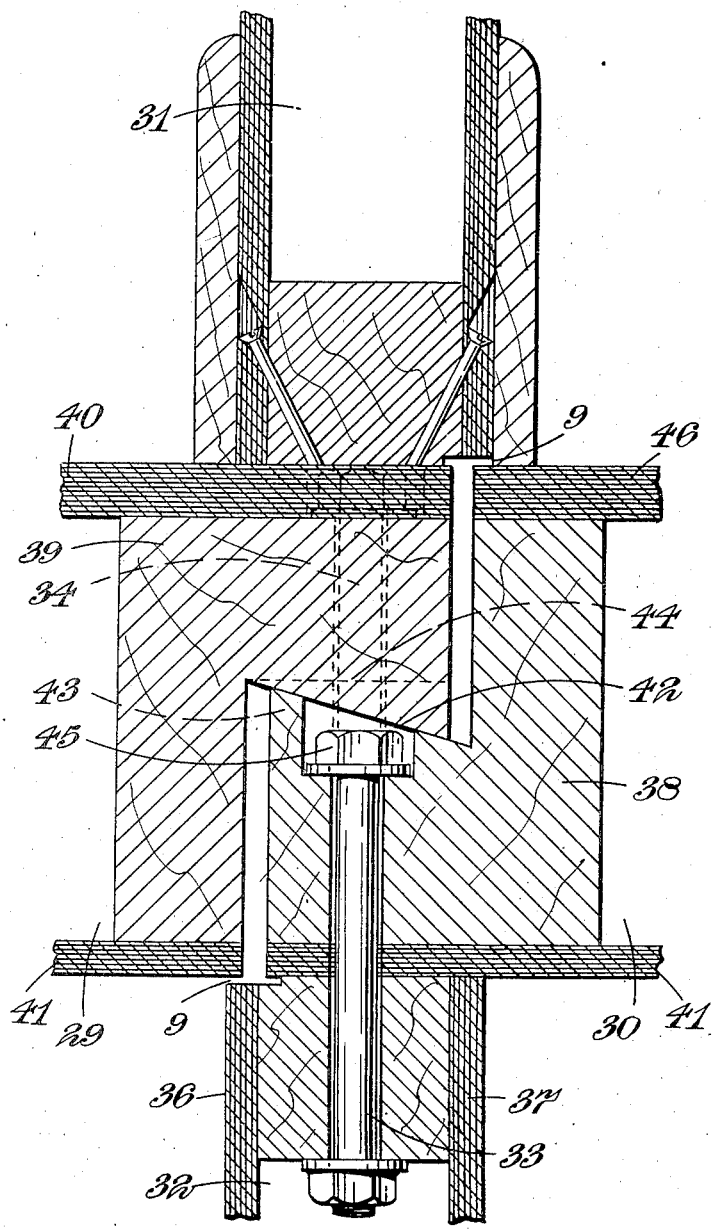

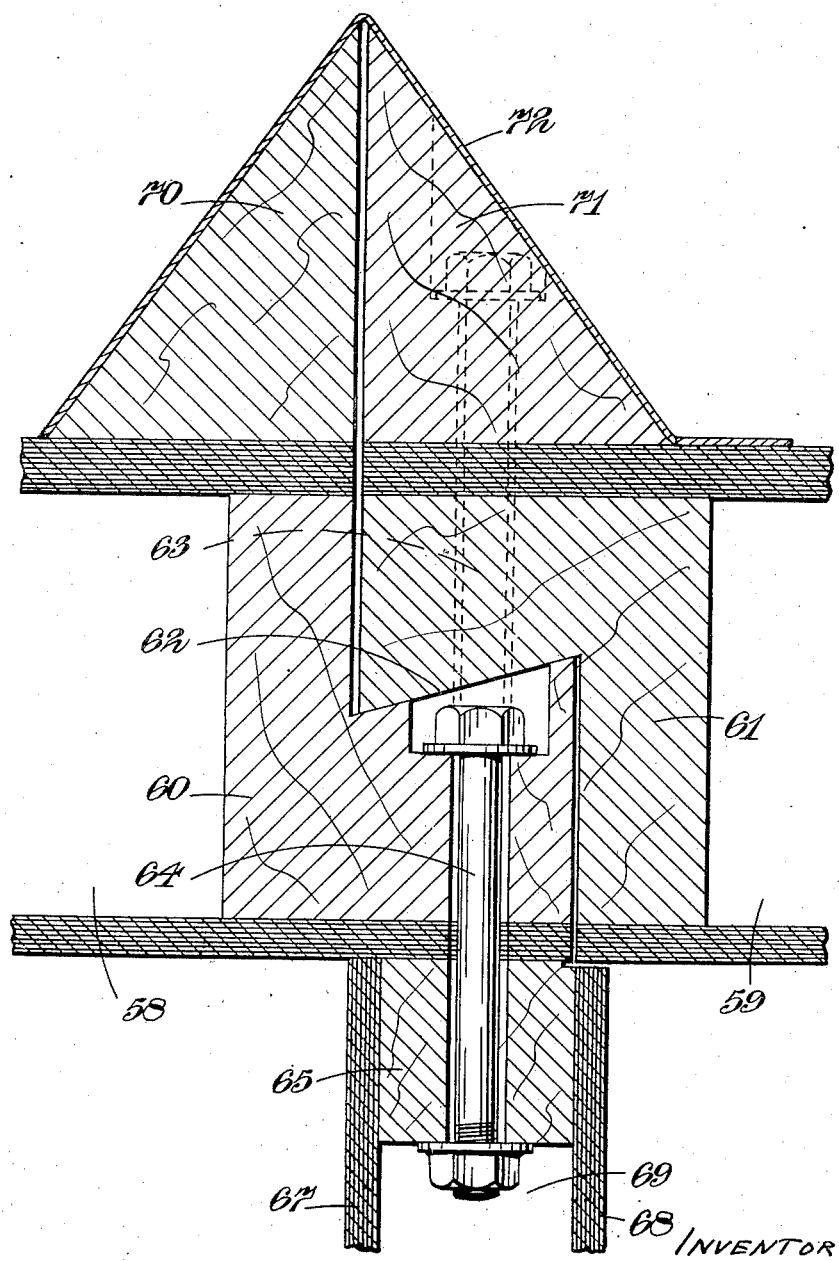

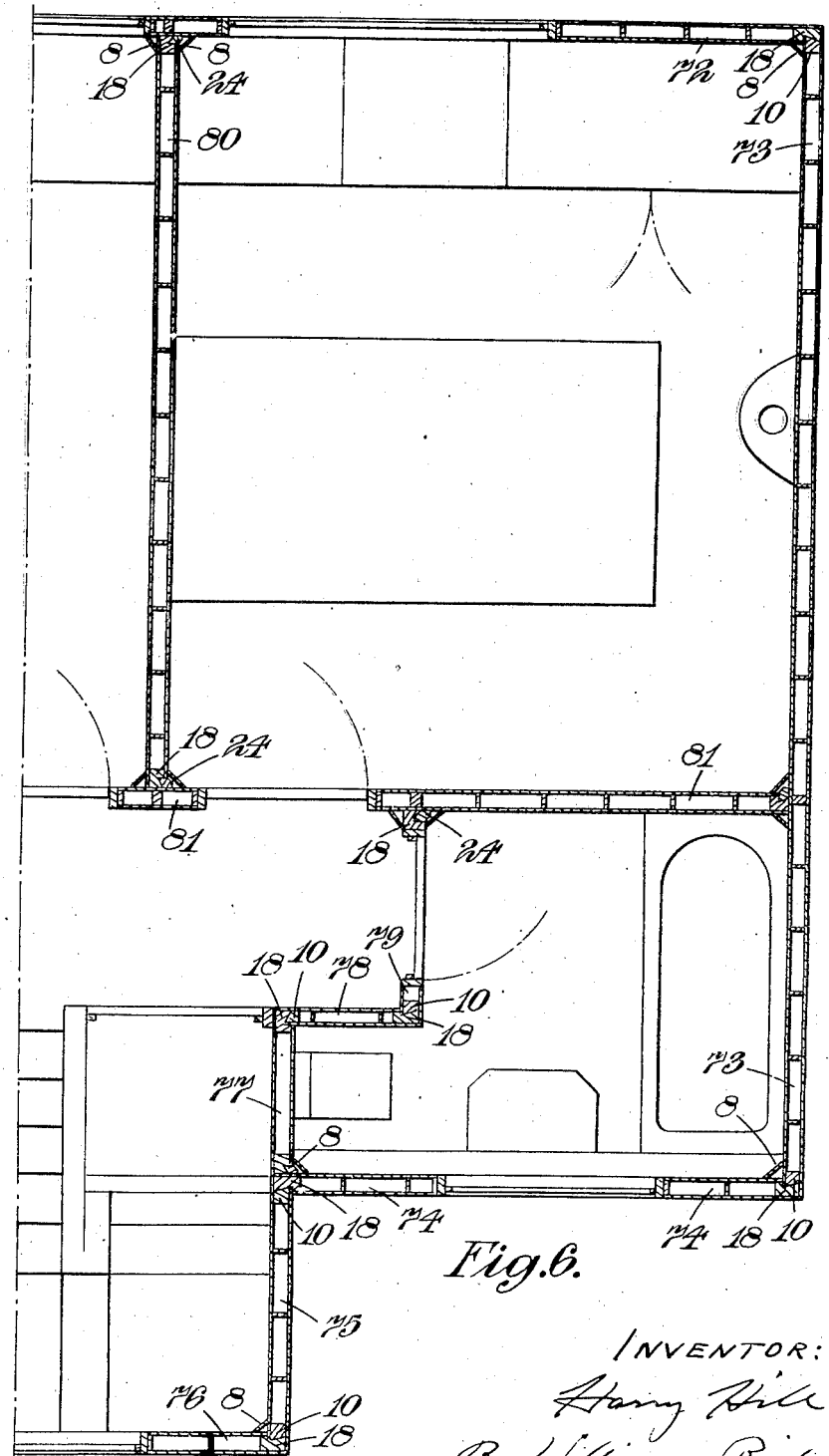

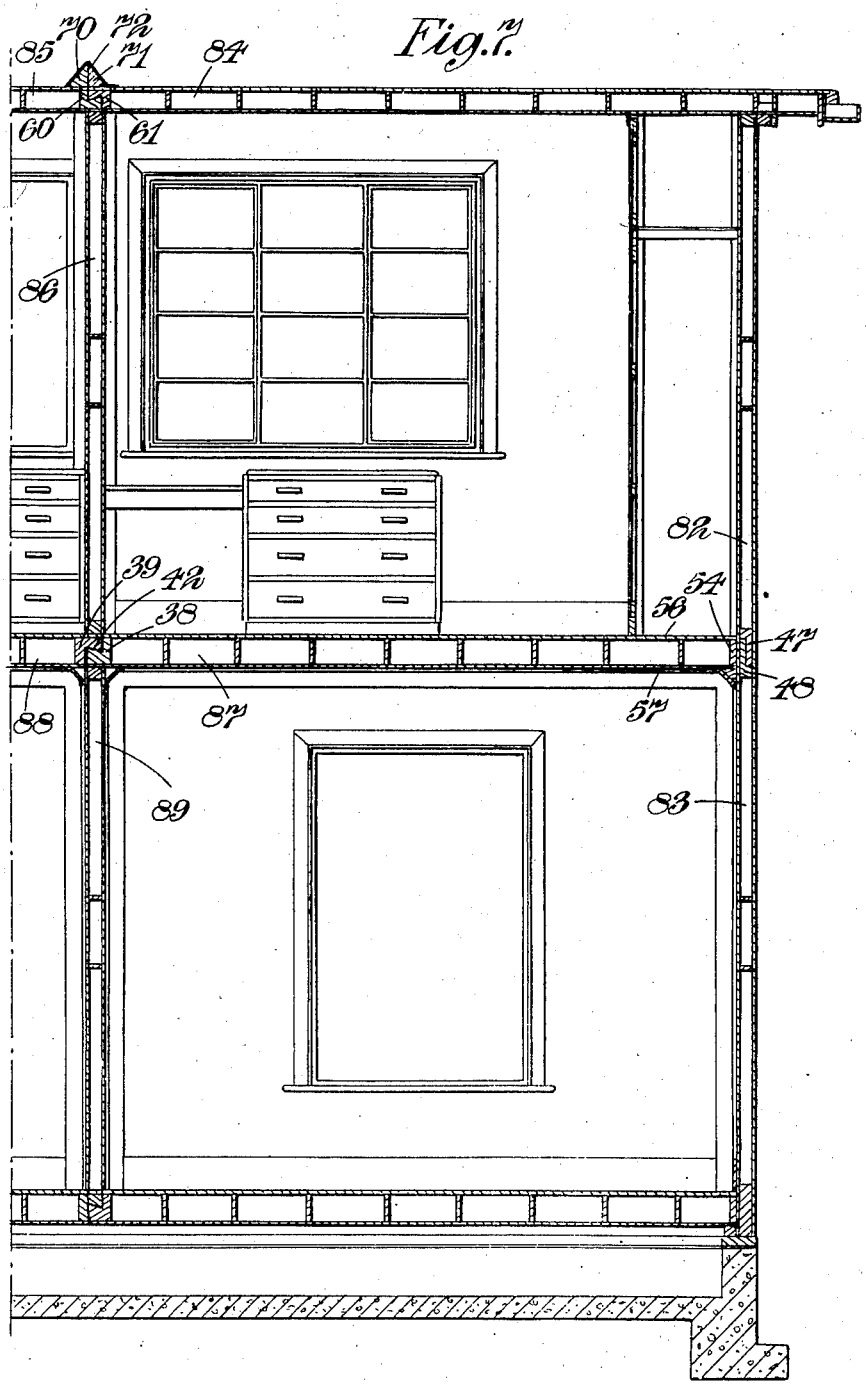

Patented Jan. 4, 1949

2,458,074

UNITED STATES PATENT OFFICE 2,458,074

BUILDING UNIT JOINT CONSTRUCTION

Harry Hill, Hampshire, England, assignor of one-half to The British Power Boat Company Limited, Hampshire, England, a British company Application August 21, 1945, Serial No. 611,772
In Great Britain February 22, 1944

3 Claims. (Cl. 20—4)

This invention relates to sectional building units of the type in which each unit comprises at least two panels or skins arranged face to face and separated by marginal members and, if required, by any number of internal stiffeners. Such units are usually separately built up on jigs in the factory, and subsequently joined together on the building site. Although jig assemblage enables a high degree of accuracy to be maintained, it is desirable that the joints between the units shall permit a reasonable tolerance in dimensions (for example $\frac{1}{16}$ of an inch), and yet provide a very rigid connection between the units. The joints between the units should also preferably be disconnectable, rather than permanent, and for which purpose, bolts, or their equivalent, have been used, rather than glue or other cement. In the case of wooden structures, in which the joint is effected between two flat faces held together by bolts passing through them, it has been found unsatisfactory to rely on the frictional grip between the two flat surfaces for resisting shear forces, or on the bolts bearing on the sides of the holes in which they are located, for preventing lateral movement. In fact, in order to permit the necessary tolerance of dimensions of the units, the holes for the bolts require to be made oversized, and thus the bearing of the bolts on the sides of the holes cannot be relied upon. It is not practicable to employ long tongue-and-groove joints between the edges of the units, since, although the units may be of substantial thickness, say of 3 to 4 inches, and are comparatively rigid to handle, nevertheless, there is a possibility of slight warping between the time of constructing the unit and erecting it, in which case the tongue-and-groove joint could not be assembled.

An object of the present invention is to provide a simple joint which will meet the above requirements.

According to this invention, a sectional building unit of the kind referred to above, is characterised in that there is provided along any side thereof which is to be joined to another unit, a junction element having an exposed jointing face oblique or parallel to the panels or skins, which junction element is provided with or adapted to receive holes for the reception of fastenings passing through the oblique or parallel faces preferably parallel or perpendicular to said panels or skins, according to whether the adjoining panels are arranged in line with one another or at right-angles thereto.

Preferably, the aforesaid junction element may also be arranged to constitute the aforesaid marginal member and serves to space the two panels or skins apart.

In one form of construction, one of the panels may be arranged to extend beyond the edge of the other panel, along that side of the unit which is to be joined to another unit, and the junction element is arranged to be supported by this extending part of the panel, as well as being secured between the two panels, the exposed face of the junction element beyond the shorter of the two panels being recessed so as to provide an oblique face which is inclined away from the wider of the two panels as it extends to the edge of the unit.

A number of embodiments of the invention are shown in the accompanying drawings, in which each of the Figures 1 to 5 is a section through joints between adjoining units.

Figure 6 is a sectional plan through a part of the first storey of a building showing the manner in which the joints of Figures 1 and 2 may be employed, and Figure 7 is a vertical section through a part of a two-storey building showing how the joints of Figures 3 to 5 may be employed.

In the case where a unit is for attachment at right-angles to another unit, as shown in Figure 1, the junction element 10 between the two panels 11 and 12 of a unit 13 has its end face oblique to the panels at such an angle that when it abuts the exposed oblique face 14 of another unit 15, the two units are disposed at right-angles. Registering holes 16 and 17 are formed in the two junction elements 10 and 18, the hole 17 in the element 18 being arranged at right-angles to the two panels 19 and 20, while the hole 16 in the other junction element 10 is parallel with the two panels 11 and 12 of its unit. It will be appreciated that with this arrangement, when the bolt 21 is tightened, the unit 13 tends to be forced against the shoulder 22 formed by the cut-away portion of the first said junction element 18, between the oblique face 23 thereof and that part which is disposed between the two panels 19 and 20. Corner pieces 8 may be secured at the junction between the two units and a packing piece 7 may be disposed between the two junction elements.

In the case where a unit is arranged for attachment at right-angles to another unit intermediate of the side edges of such a unit so as to provide a T-joint, as shown in Figure 2, a fillet piece 24 is secured to the face of one of said panels, which fillet piece has one face 26 thereof oblique to the face of the panel at such an angle that when engaged by the oblique face 23 of the junction element 18 of the unit 13, the two units 13 and 27 are arranged at right-angles. In such an arrangement, the bolt hole 28 in the fillet piece 24 is arranged to extend parallel with the face of the panel 25, whereas the hole 17 in the junction piece is at right-angles to the panels 19 and 20, as in the previous arrangement.

In the case where two units require to be secured edge-on to one another, they are both provided with junction pieces each arranged in the manner first referred to above, in which case, the wider of the two panels (such as panel 19) of one unit is arranged in line with the shorter of the two panels (such as panel 20) of the other unit. The holes in both junction pieces extend at right-angles to the two panels of its respective unit and the holes are so disposed that a gap is provided between the stepped end faces of each junction piece, thus allowing for tolerances in the dimensions of the units.

In the case where this latter construction is arranged for joining two floor units 29 and 30 together, as shown in Figure 3, and in which the junction is arranged to fall within the confines of upper and lower partition walls 31, 32, two sets of securing bolts 33 and 34 may be provided. One set of securing bolts 33 may be arranged to extend through a top marginal element 35 between the panels 36, 37 of the lower partition wall 32 and through one of the junction elements 38, whereas the other set of bolts 34 may be arranged to extend through said marginal element 35 and both junction elements 38 and 39. The upper and lower panels 40 and 41 of the two units may constitute the floor and ceiling respectively, which are thus attached rigidly together from one unit to the other, and also to the lower partition wall 32.

It will be appreciated that exact alignment of the floor and ceiling surfaces of adjacent units cannot be relied on, but allowance for out of alignment may be arranged by relieving the edges of one or other of the panels of the partition walls, as indicated at 9, so that each partition abuts one floor panel only.

Where a number of such units are arranged side-by-side across the width of the partition wall, the cooperating oblique faces 42 of one pair of units is arranged to slope in the opposite direction to the oblique faces 43 of the adjacent unit. To prevent possible interference at the corners where two such different pairs adjoin, the oblique faces may be cut down for a short length, as shown by the dotted lines 44, 45.

In the case where one vertically disposed unit 49 is arranged above another unit 50, as in the case of an outer wall (see Figure 4) the overlapping junction faces 46 of the junction elements 47, 48 may be parallel with the faces of the panels instead of being oblique. In such an arrangement, the outer walls are first erected on a prepared foundation up to the level of the first floor, the internal partition walls are then inserted, followed by the units forming the ground floor. These floor units are arranged to cover the span between the outside walls in two or more units so that any discrepancy between the spacing of the outer walls and the sum of the dimensions of the floor units may be taken up in the joints between the latter. As shown in Figure 4, a first floor unit 51 is arranged to abut against the inner panels 52 and 53 of the wall units 49 and 50, and the panels 56, 57 embrace a fillet 54 secured to the wall units by bolts 55 which pass through it and the overlapping portions of the junction elements 47 and 48 of the two wall units. In the case of a ground floor, a suitable support may be provided for the floor on the foundation.

As shown in Figure 5, a flat roof may be constructed in a similar manner to that shown in Figure 3 by a number of abutting units 58, 59 having junction elements 60, 61 with overlapping oblique faces 62, secured together by bolts 63 passing through the junction elements at right-angles to the panels and having a set of bolts 64 which may pass through an upper marginal element 65 secured between two panels 67, 68 of a partition wall 69. In order to ensure a watertight joint between the exposed abutting edges of the outer panels, triangular ridge-pieces 70, 71 are secured to the outer panels so as to abut one another, which triangular ridge-pieces are covered by a capping of metal, plywood or other impervious material.

Referring now to Figure 6, it will be seen that the pairs of outside walls 72, 73, 73, 74, 74, 75 and 75, 76 are all secured together by joints such as shown in Figure 1. The same type of joint may be employed for securing internal walls at right-angles as, for example, the pairs of walls 77, 78 and 78 and 79. Internal partition walls may be secured to one another or to the outside walls by T joints of the kind shown in Figure 2. Such joints are illustrated in Figure 6, for connecting the pairs of walls 80, 72, 81, 73 and 81, 80.

Referring now to Figure 7, an upper wall unit 82 may be secured to a lower wall unit 83 and to a floor-ceiling unit 56, 57 by a joint such as is shown in Figure 4. Two flat roof sections 84, 85 may be joined to one another and to an upper storey internal partition wall 86 by a joint such as is shown in Figure 5. The internal partition wall 86 may be secured to two floor and ceiling sections 87, 88 and to a lower storey internal partition 89 by a joint such as is shown in Figure 3.

In any of the arrangements referred to above, the aforesaid panels may be formed from plywood, metal, fibre or plastic material, and the junction pieces or marginal members may be formed from timber. Any permanent joints, as between the junctions and their units, or between fillet pieces and the panels, may be made with waterproof synthetic resin glue. In order to compensate for shrinkage or seasonal variations in the dimensions of the various parts of the structure, strong spring washers may be employed with the aforesaid clamping bolts. The holes through which the securing bolts pass are arranged to provide a considerable clearance for example when ½ inch diameter bolts are employed the holes are ¾ of an inch in diameter.

I claim:

1. A joint structure between two prefabricated building units extending substantially at right angles to one another, each of said units having parallel face-forming panels, one of said units having a first panel extending beyond the edge of a second panel, a junction element secured to and extending between said panels, said element having an oblique face overlying the extended portion of said first panel and sloping toward this panel as it extends inwardly of the unit and a shoulder extending from the inner end of said face to the edge of said second panel substantially at right angles thereto, the other of said units being provided at the point of connection between units with a second junction element having a face of complementary slope to said oblique face, the first mentioned junction element having a hole at right angles to the panels of its unit and the said second junction element having a hole parallel to the panels of its unit, and a bolt of smaller diameter than said holes passing therethrough, whereby tightening of said bolt draws said junction elements together and draws the said other of said units into engagement with said right angle shoulder.

2. A joint structure according to claim 1 wherein said second junction element is a solid member secured between the adjacent marginal portions of the panels of the unit of which it forms a part, the said panels being in alinement at their edges with the sloping face of said junction element, whereby a corner joint is formed.

3. A joint structure according to claim 1 wherein said second junction element is a fillet piece secured to the face of a unit intermediate its edges, said piece having an outer face parallel to the panels of the unit to which it is attached and an oblique face complementary to the oblique face on the junction element to which it is joined.

HARRY HILL.

REFERENCES CITED

The following references are of record in the file of this patent:

UNITED STATES PATENTS

| Number | Name | Date |
|---|---|---|
| 1,045,223 | Uhlinger | Nov. 26, 1912 |
| 2,092,697 | Gramelspacher | Sept. 7, 1937 |
| 2,226,332 | Bacci | Dec. 24, 1940 |
| 2,329,041 | Ford | Sept. 7, 1943 |